(12) United States Patent
Araki et al.

(10) Patent No.: US 7,765,821 B2
(45) Date of Patent: Aug. 3, 2010

(54) SEAL DEVICE AND SEALING STRUCTURE

(75) Inventors: Yoshinori Araki, Chiryu (JP); Takuya Natsume, Kariya (JP)

(73) Assignee: Denso Corporation, Kariya (JP)

( * ) Notice: Subject to any disclaimer, the term of this patent is extended or adjusted under 35 U.S.C. 154(b) by 723 days.

(21) Appl. No.: 11/645,282

(22) Filed: Dec. 22, 2006

(65) Prior Publication Data

US 2007/0144208 A1 Jun. 28, 2007

(30) Foreign Application Priority Data

Dec. 27, 2005 (JP) ............................. 2005-375669
Sep. 28, 2006 (JP) ............................. 2006-265520

(51) Int. Cl.
*F25B 41/04* (2006.01)
*F16J 15/02* (2006.01)

(52) U.S. Cl. ............................ 62/225; 62/224; 277/630

(58) Field of Classification Search .................. 62/239, 62/244–245, 298, 224–225; 277/630, 634, 277/365, 637, 641, 644, 647
See application file for complete search history.

(56) References Cited

U.S. PATENT DOCUMENTS 5,165,251 A * 11/1992 Tsukamoto et al. ........... 62/244
5,555,739 A * 9/1996 Kujirai et al. ................. 62/244
7,066,471 B2 6/2006 Mause et al.

FOREIGN PATENT DOCUMENTS

| JP | 06-28431 | | 4/1994 |
| JP | 2001-026213 | | 1/2001 |
| JP | 200126213 | * | 1/2001 |
| JP | 2002-301927 | | 10/2002 |

* cited by examiner

*Primary Examiner*—Frantz F. Jules
*Assistant Examiner*—Cassey Bauer
(74) *Attorney, Agent, or Firm*—Harness, Dickey & Pierce, PLC (57) ABSTRACT

A seal device has a for sealing a through hole in a partition includes a first seal for providing a first abutment portion that abuts against a periphery of the through hole in an entirety thereof, and a second seal for providing a second abutment portion that is made of an elastic material for abutting against an outer peripheral surface of a component disposed in the through hole. The first seal and the second seal are connected to cover an entire periphery of the through and the component, and a support member on the second seal has an inner surface shaped in a corresponding form of the component.

15 Claims, 5 Drawing Sheets

SEAL DEVICE AND SEALING STRUCTURE

CROSS REFERENCE TO RELATED APPLICATION

This application is based on and claims the benefit of priority of Japanese Patent Application No. 2005-375669 filed on Dec. 27, 2005, and No. 2006-265520 filed on Sep. 28, 2006, the disclosure of which is incorporated herein by reference.

FIELD OF THE INVENTION

The present invention generally relates to a seal device for sealing a component.

BACKGROUND OF THE INVENTION

In recent years, a seal device for sealing a component in a through hole bored in a partition that divides two spaces is generally known as a sealing structure. More practically, the sealing structure seals a periphery of the through hole and an outer circumference of the component disposed therein.

For example, Japanese patent document JP-A-2001-26213 discloses a vehicular air-conditioning unit with the through hole bored in a case that divides an inside air passage from an outer space. The through hole in the case has an expansion valve disposed therein. The gap between the case and the expansion valve is sealed in its entirety with a grommet that serves as a sealing device.

The expansion valve disclosed in the above patent document has a sealing structure formed integrally thereon in a relatively simple form that extends from a body of the expansion valve. The grommet abuts to the sealing structure to complete the sealing structure. The sealing structure for sealing the expansion valve aims to achieve a stable seal by circumventing a problem that arises from a complicated outer shape of the expansion valve.

However, the sealing structure for sealing the air-conditioning unit in the above description has a problem due to an increased volume of the expansion unit having the sealing structure disposed thereon. That is, according to the study conducted by the inventors, a stable seal of the sealing structure for sealing the complicated outer shape of the expansion valve deteriorates when a sealing surface pressure of an abutment portion of the sealing device is not evenly provided in a circumferential direction.

SUMMARY OF THE INVENTION

In view of the above-described and other problems, the present disclosure provides a seal device that stably seals a component disposed in a through hole in a partition even when an outer shape of the component is complex.

In one aspect of the present disclosure, a seal device for sealing a through hole in a partition includes a first seal for providing a first abutment portion that abuts against a periphery of the through hole in an entirety thereof, and a second seal for providing a second abutment portion that is made of an elastic material for abutting against an outer peripheral surface of a component disposed in the through hole. The first seal and the second seal are connected to cover an entire space between the periphery of the through hole and the outer peripheral surface of the component. The second seal has a support member with a higher elasticity relative to the second abutment portion on an outer side of the second abutment portion. The support member has an inner peripheral surface thereof shaped in a corresponding form of the outer shape of the component and has a bent facing section of the inner peripheral surface thereof shaped in a corresponding form of the bent portion of the component for sealing the component in the through hole.

The seal device having above-described structure has the second abutment portion on the second seal formed in a corresponding shape of the outer surface of the component for both of a linear portion and a bent portion, thereby providing an evenly distributed surface pressure on the outer surface of the component for secure sealing without increasing a volume of the seal device when the component has a complex outer shape.

In another aspect of the present disclosure, the second seal has an elongated protrusion for accommodating the component having various sizes.

In yet another aspect of the present disclosure, the second seal has a rib shape protrusion for accommodating the component in various sizes.

In still yet another aspect of the present disclosure, the elongated protrusion and the protrusion in the rib shape are combined for sealing the component. The connection portion of the both shapes has a smooth transition shape for secure sealing. Further, the elongated protrusion is abutted against the linear portion of the component outer surface, and the protrusion in the rib shape is abutted against a bent portion for preventing the seal from unintended deformation.

In still yet another aspect of the present disclosure, the second seal has a restrictive protrusion for controlling the amount of warpage of the connection portion.

In still yet another aspect of the present disclosure, the elongated protrusion is tilted in an insertion direction of the component for secure sealing and for the ease of insertion of the component.

In still yet another aspect of the present disclosure, the rib shape protrusion has a concave at a bottom for stably sealing the component.

In still yet another aspect of the present disclosure, the first seal and the second seal are separately disposed and are interconnected with a deformable connection portion for stably sealing the component even when the position of the component is dislocated.

In still yet another aspect of the present disclosure, the partition in the vehicle is sealed by the seal device for secure sealing without compromising other restrictive conditions.

In still yet another aspect of the present disclosure, the partition in the vehicle is used for housing an air-conditioner for improved usability.

In still yet another aspect of the present disclosure, the component as an object of sealing is an expansion valve of a heat-exchanger.

In still yet another aspect of the present disclosure, the expansion valve in a complex shape is sealed by the seal device that is shaped in a corresponding shape of the outer surface of the expansion valve for accommodating a complex shape.

In still yet another aspect of the present disclosure, the second seal has the second abutment portion that is disposed in an angle for collecting water condensation formed thereon through a water passage for preventing accumulation of the water.

In still yet another aspect of the present disclosure, the water passage is used for streaming the water into an inside of the case for draining.

In still yet another aspect of the present disclosure, the first seal wraps a tip end of a protrusion on the entire periphery of the through hole for evenly providing secure sealing.

In still yet another aspect of the present disclosure, the first seal has a slit portion for securely holding the entire periphery of the partition and for secure sealing.

In still yet another aspect of the present disclosure, a sealing structure of the seal device is devised by having the first seal and second seal with accompanying support parts for accommodating a complex shape of the component disposed in the through hole of the partition. In the above-described manner, the sealing structure of the seal device securely seals the component in a complex shape without increasing the volume of the seal device.

BRIEF DESCRIPTION OF THE DRAWINGS

Other objects, features and advantages of the present invention will become more apparent from the following detailed description made with reference to the accompanying drawings, in which.

DETAILED DESCRIPTION OF THE PREFERRED EMBODIMENTS

Embodiments of the present disclosure are described with reference to the drawings. Like parts have like numbers in each variation of the embodiments when the embodiment is described for more than one case.

Figure 1:
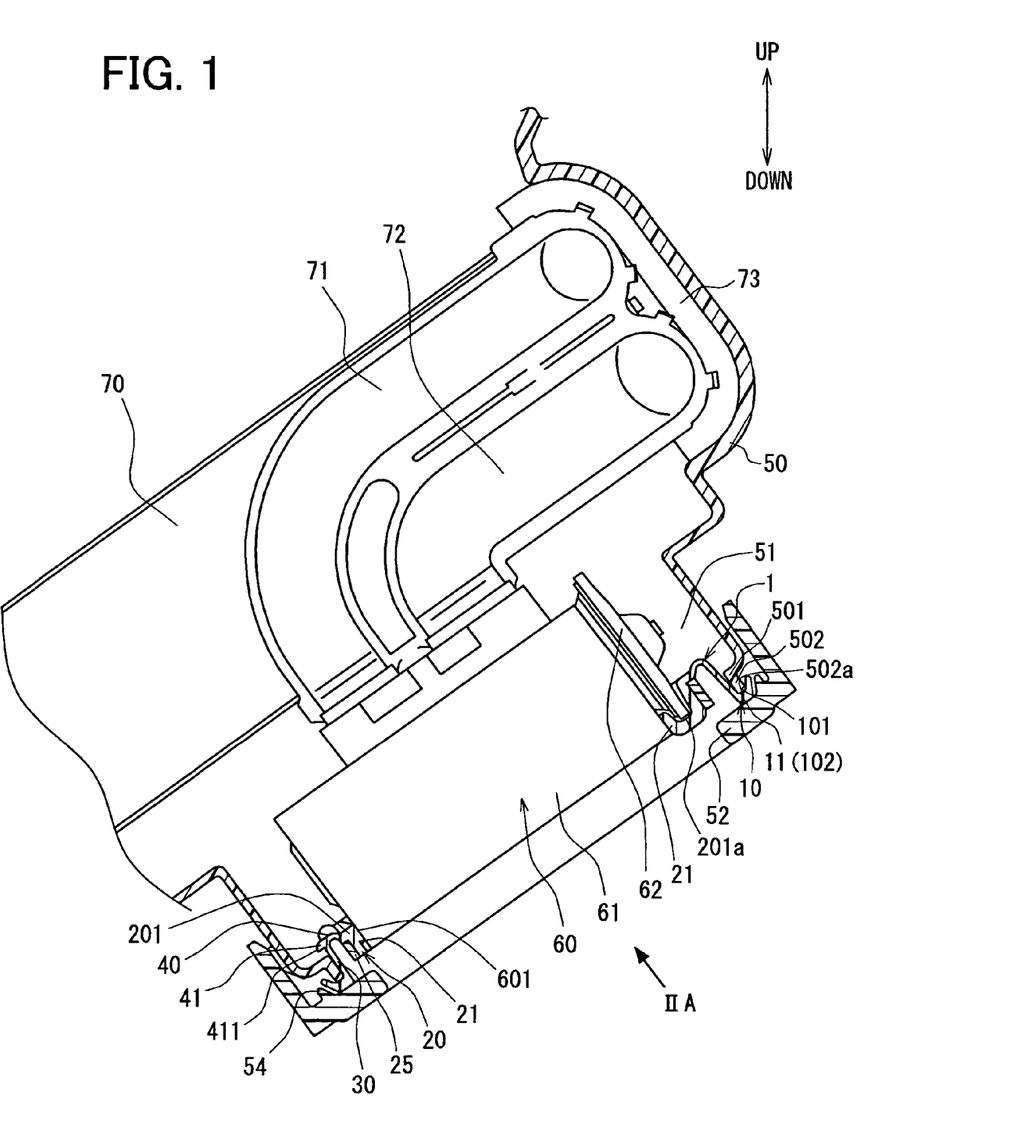
FIG. 1 shows a cross-sectional view of a sealing structure of a seal device for sealing an air-conditioner in a vehicle in an embodiment of a present disclosure.

FIG. 1 shows a cross-sectional view of a sealing structure of a seal device 1 for sealing an air-conditioner in a vehicle in an embodiment of a present disclosure.

Figure 2:
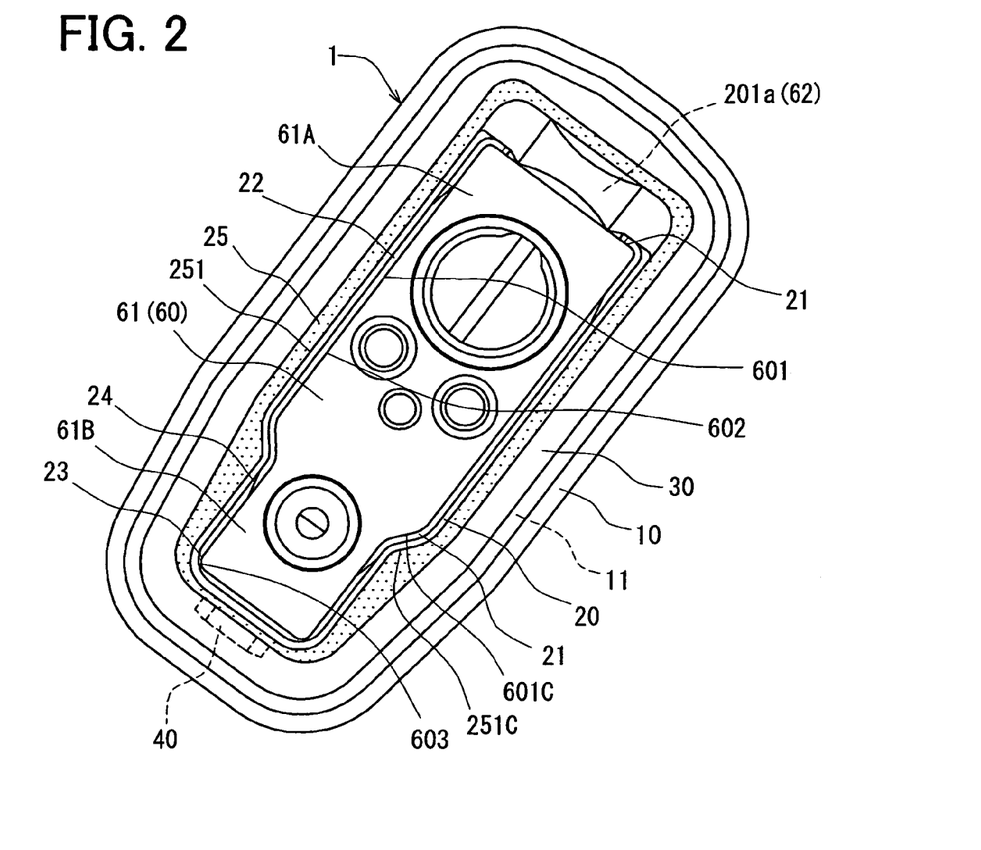
FIG. 2 shows an illustration of the sealing structure seen from a direction of an arrow A in FIG. 1.
Figure 3:
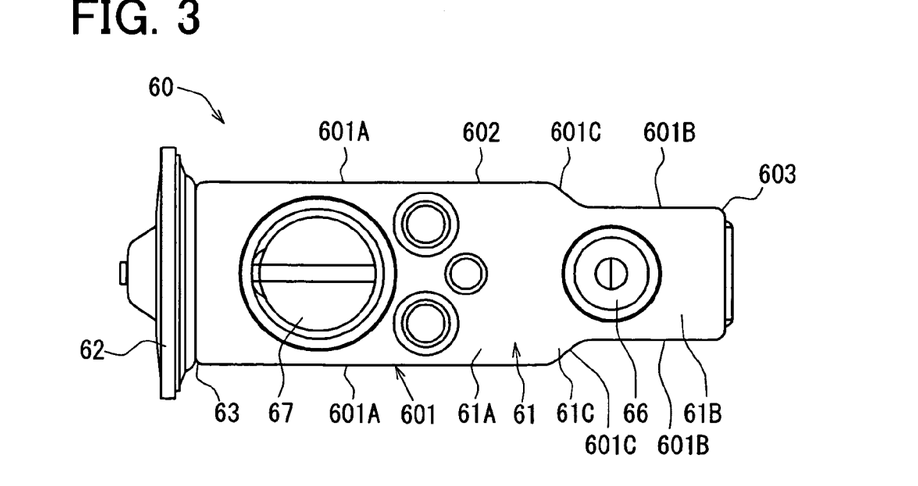
FIG. 3 shows a front view of an expansion valve as a simple component.
Figure 4:
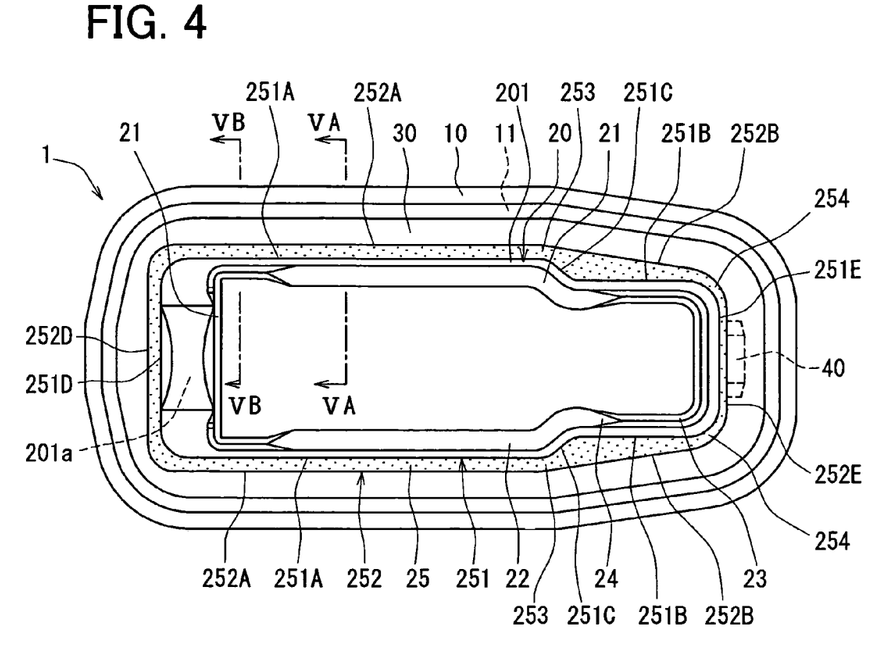
FIG. 4 shows a front view of the seal device as a simple component.
Figure 5A:
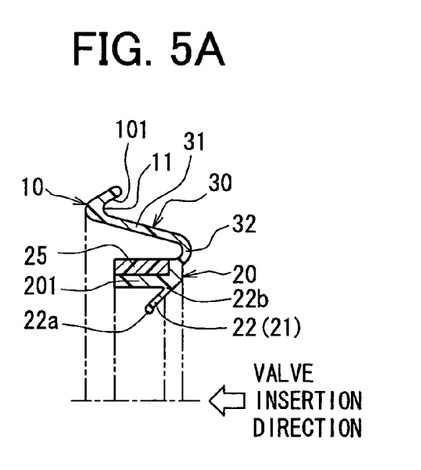
FIGS. 5A and 5B show cross-sectional views of the seal device respectively taken along a line VB_VB and a line VC_VC in FIG. 4.
Figure 5B:
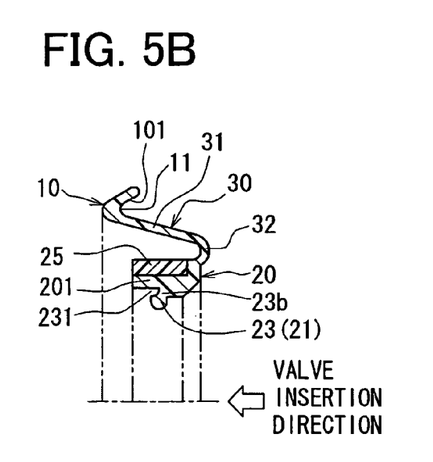

FIG. 2 shows an illustration of the sealing structure seen from a direction of an arrow A in FIG. 1. In FIG. 2, a case 50 and related parts are omitted from the figure for the clarity of engagement between an expansion valve 60 and the seal device 1. FIG. 3 shows a front view of the expansion valve 60 as a simple component. FIG. 4 shows a front view of the seal device 1 as a simple component. FIGS. 5A and 5B show cross-sectional views of the seal device 1 respectively taken along a line VB_VB and a line VC_VC in FIG. 4.

An air-conditioner unit of the present disclosure shown in FIG. 1 includes the case 50 made of a synthetic resin. The air-conditioner unit is disposed in the vehicle with its upside and downside orientation aligned with an arrow in FIG. 1. The case 50 has an air passage disposed therein for blowing conditioned air into the vehicle. In other words, the air passage is formed by separating a passage from an in-vehicle space in an enclosing manner. Thus, the case 50 serves as a partition of a space in the vehicle.

The case 50 has an evaporator 70 disposed therein that refrigerates air in the case 50 by providing cooling heat-exchanger function.

The evaporator 70 has a structure that includes two tanks with plural tubes for interconnecting the two tanks. Each of the plural tubes has inner fins disposed therein and outer fins disposed therebetween.

An upper tank of the evaporator 70 has a coolant inlet pipe 71 and a coolant outlet pipe 72 on its side face, and the expansion valve 60 is connected to both of the coolant inlet pipe 71 and the coolant outlet pipe 72. The expansion valve 60 is disposed in a through hole 51 that is formed in the case 50.

The expansion valve 60 includes a diaphragm 62 and a body 61. The diaphragm 62 of the expansion valve 60 further includes a diaphragm space that seals a coolant gas with a diaphragm member (not shown). The body 61 of the expansion valve 60 has a needle valve that is connected to the diaphragm member with a heat-sensing rod.

As shown in FIG. 3, the body 61 as a simple component includes a first body portion 61A in a square shape, and a second body portion 61B in a narrower square shape relative to the first body portion 61A. The first body portion 61A has in the square shape when seen from an axial direction of a coolant inlet hole 66 and a coolant outlet hole 67 that respectively accept the coolant inlet pipe 71 and the coolant outlet pipe 72. The second body portion 61B is formed integrally with the first body portion 61A. The boundary between the first body portion 61A and the second body portion 61B is formed as a step portion 61C. The step portion 61C is formed on both sides in a width direction of the body 61.

The first body portion 61A has the coolant outlet hole 67 that streams the coolant from the evaporator 70. The second body portion 61 B has the coolant inlet hole 66 that has a smaller diameter relative to the coolant outlet hole 67 for streaming the coolant into the evaporator 70. The body 61 has the diaphragm 62 on the left side in FIG. 3, that is, on an opposite side of the second body portion 61B relative to the first body portion 61A.

An outer surface 601 of the body 61 is formed in the following manner. That is, a distance between two linear sides 601B on an upside and a downside of the second body portion 61B is narrower than a distance between two linear sides 601A on an upside and a downside of the first body portion 61A as shown in FIG. 3. Further, the outer spherical surface 601 at the step portion 61C is formed as a curved portion 601C that connects the linear sides 601A and 601B with each other smoothly in a regular shape.

As shown in FIG. 3, the expansion valve 60 is a component with the outer surface 601 formed in a complex shape that includes not only a corner portion 603 but also the curved portion 601C in the present embodiment.

The expansion valve 60 detects coolant temperature on an outlet side of the evaporator 70 by the heat-sensing rod and controls the amount of the coolant in a high pressure and in high temperature provided from a receiver (not shown) based on the detected coolant temperature on the outlet side. The coolant is evaporated by jetting out the coolant from a small hole of a needle valve and is provided for the evaporator 70 through the coolant inlet pipe 71 in a mist form with a lowered pressure and temperature. The piping of the coolant connected to the expansion valve 60 from a lower side of the valve 60 is not shown in FIG. 1.

The evaporator 70 is abutted against the case 50 with a packing 73 having low elasticity interposed therebetween in a floating manner. The packing 73 is made of a foaming resin. Therefore, the position of the expansion valve 60 connected to the evaporator 70 with the pipes 71, 72 in the through hole 51 of the case 50 may not be stably determined.

A gap between the outer surface 601 of the expansion valve 60 in the through hole 51 and a through-hope periphery 501 of the case 50 is sealed by the seal device 1 in its entirety along an imaginary surface that substantially perpendicularly cuts an axis of the through hole 51.

The seal device 1 includes a first seal 10 and a second seal 20. The first seal further includes a first abutment portion 11 that is abutted against the through-hope periphery 501 in an entirety of a circular direction, and the second seal 20 further includes a second abutment portion 21 that is abutted against an outer surface 601 of the expansion valve 60 in an entirety of a circular direction. More practically, the second abutment portion 21 of the second seal 20 protrudes inwardly from a body 201 of the second seal 20 to be abutted against the outer surface 601 of the expansion valve 60. The first seal 10 and the second seal 20 are disposed separately from each other, and are connected with each other by having a connection portion 30 interposed therebetween.

The second seal 20 has a support plate 25 on an outer side of the second abutment portion 21. More practically, the second abutment portion 21 has the support plate 25 on its outer periphery of the body 201 on an opposite side of the expansion valve 60. The support plate 25 is formed in a corresponding shape of an outer shape, i.e., an outer surface 601 shown in FIG. 3, of the expansion valve 60. The support plate 25 is provided as a peripheral member having a larger inner surface 251 relative to the outer surface 601 of the expansion valve 60. In other words, the support plate 25 fills in the gap between the outer surface 601 of the expansion valve 60 and the inner surface 251 of the support plate 25 by having a substantially same radial thickness along the circular direction as shown in FIG. 4.

The support plate 25 having a ring shape is formed in a substantial hexagonal form that has two sides spaced in a decreasing width in the with direction as shown in FIG. 4. The two side bend in the middle of two longer sides that extend substantially in parallel with each other in the longitudinal direction of the expansion valve 60 for having the decreasing width.

Further, the inner surface 251 of the support plate 25 is formed to fit the outer surface 601 of the expansion valve 60 as shown in FIG. 3, and the step portion 61C, i.e., the curved portion 601C of the outer surface 601, is fitted by a step shape section of the inner surface 251 of the support plate 25.

The inner surface 251 of the support plate 25 includes a linear section 251A that faces the linear side 601A of the first body portion 61A and a linear section 251B that faces the linear side 601B of the second body portion 61B as shown in FIG. 3. Further, the step shape section of the inner surface 251 having the step shape faces the step portion 61C of the expansion valve 60, and is formed as a step shape portion 251C for smoothly connecting the linear section 251A and the linear section 251B.

The support plate 25 surrounds not only the body 61 but also the diaphragm 62 as shown in FIG. 3. A pair of the linear sections 251A of the inner surface 251 in FIG. 4 are connected to each other by a liner section 251E that fits to the second body portion 61B on the right side in FIG. 3.

That is, the support plate 25 is has the linear sections 251A, 251B, 251D, 251E and the step shape portion 251C as the inner surface 251 that is formed to fit a substantially octagonal outer shape of the outer surface 601 of the body 61 of the expansion valve 60 for surrounding the diaphragm 62 and the body 61, i.e., a whole component of the expansion valve 60.

An outer surface 252 of the support plate 25 has, as shown in FIG. 4, linear sections 252A, 252B, 252D, 252E connected with each other to form a substantially hexagonal shape with smooth transitions interposed therebetween.

The linear section 252A is disposed on an outside of the linear section 251A of the inner surface 251. Likewise, the linear sections 252B is disposed on an outside of the linear section 251B and the step shape portion 251C of the inner surface 251, and the linear section 252D is disposed on an outside of the linear section 251D of the inner surface 251. Further, the linear section 252E is disposed on an outside of the linear section 251E of the inner surface 251.

A portion of the support plate 25 is formed as a slant section as shown in FIG. 4. That is, a section between a corner 253 and a corner 254 is formed as the linear section 252B that gradually approaches a center axis in the longitudinal direction that is aligned in right-left direction in FIG. 4. The section between the corner 253 and the corner 254, that is, the section surrounded by the linear section 251B, the step shape portion 251C, and the linear section 252B beside the body 61 of the expansion valve 60, is thicker than other section in the support plate 25.

In this manner, an outer side of the step shape portion 251C formed thicker than the other section in the support plate 25 provides an increased stiffness without increasing the volume of the support plate 25 even when the inner surface 251 is bent at the step shape portion 251C.

The expansion valve 60 has a narrow part 63 at a connecting portion of the diaphragm 62 to the body 61. That is, the narrow part 63 has a decreased diameter relative to the other part of the expansion valve 60 as shown in FIG. 3. The second abutment portion 21 in the seal device 1 in the present embodiment is, as shown on the left side in FIG. 4, inserted in the narrow part 63 of the expansion valve 60.

The second seal 20 on the left side in FIG. 4, that is, a gap between the linear section 251D of the inner surface 251 of the support plate 25 and the second abutment portion 21, has a concave housing 201a for housing the diaphragm 62. Thus, the seal device 1 houses-the diaphragm 62 in the concave housing 201a with the second abutment portion 21 in the narrow part 63 pressed against the body 61 when the expansion valve 60 is disposed on the seal device 1 in an inserting manner as shown in FIG. 1.

The first seal 10, the second seal 20 with the exception of the support plate 25, and the connection portion 30 are made of rubber (e.g., EPDM material) or thermoplastic elastomer in an integral form. The support plate 25 of the second seal 20 is made of resin material such as polypropylene or the like, and is inserted for integration with the portion made of rubber or thermoplastic elastomer.

Therefore, the support plate 25 has a higher elasticity relative to the elastic portion including the first seal 10, the second seal 20 with the exception of the support plate 25 and the connection portion 30.

The connection portion 30 made of rubber or thermoplastic elastomer connects the first seal 10 and the second seal 20 in a J shape in the cross section as shown in FIGS. 1, 5A and 5B. More practically, the connection portion 30 includes a linear portion 31 and a bent portion 32 formed in a U shape.

The first seal 10 is formed in a substantial V shape in its cross section, and has a concave 101 for having a protruding edge 502 of the case 50. The linear portion 31 of the connection portion 30 is connected to an edge of an inner surface side of the first seal 10 on one end, and extends toward the lower right direction in FIGS. 5A and 5B, that is, toward a center of the through hole 51 or toward the inside of the case 50 having the expansion valve 60 disposed therein. Further, the bent portion 32 connects the other end of the linear portion 31 and the right most portion of the outer surface of the second seal 20 as shown in FIGS. 5A and 5B.

In this manner, the connection portion 30 is not only formed with a low elasticity material, but also formed in an easily bendable form. More practically, the connection portion 30 deforms at the bent portion 32 in a manner that changes the width of the bent portion 32 in the vertical direction in FIGS. 5A, 5B with a slant angle of the linear section 31 changed in accordance with the width of the bent portion 32.

The second abutment portion 21 of the second seal 20 in the seal device 1 protrudes inwardly from the body 201 as shown in FIG. 4. Further, a seal lip 22 formed as an elongated protrusion and a seal rib 23 formed as a protrusion in a rib shape are connected with each other by a morph portion 24 in the second abutment portion 21 in a gradually morphing manner to form a ring.

As shown in a cross section in FIG. 5A, the seal lip 22 formed in a thin plate shape protrudes obliquely on an inside of the second seal 20 in an insertion direction of the expansion valve 60.

More practically, the inner surface of the body 201 of the second seal 20 is connected to a base portion 22b of the seal lip 22 as shown on a valve insertion side, that is, on the lower right side in FIG. 5A. Further, the seal lip 22 has a tip end 22a that protrudes obliquely inwardly toward a head of the expansion valve 60, that is, toward the left side of FIG. 5A, relative to the base portion 22b.

The seal lip 22 formed obliquely in the above-described manner improves ease of insertion of the expansion valve 60 and provides a stable sealing between the seal lip 22 and the expansion valve 60 with the seal lip 22 bent by the expansion valve 60 in the insertion direction.

The seal rib 23 formed substantially in a half circle in the cross section as shown in FIG. 5B protrudes inwardly approximately at a center portion of the inner surface of the body 201 of the second seal 20 in the insertion direction.

The seal rib 23 has a smaller amount of protrusion in comparison with the seal lip 22 in the vertical direction of FIG. 5B. For example, the amount of protrusion of the seal rib 23 is about one half to one third of that of the seal lip 22. Further, the seal rib 23 is thicker by 3 to 5 times relative to the seal lip 22.

A base portion 23b of the seal rib 23 has a concave 231 on an inside of the second seal 20 in the insertion direction of the expansion valve 60.

The concave 231 formed on the base portion 23b of the seal rib 23 allows a portion of the seal rib 23 to be bent toward the concave 231 in the course of insertion of the expansion valve 60 into the case 50, thereby improving the ease of insertion of the expansion valve 60. Further, the seal rib 23 pressed by the expansion valve 60 is bent in a direction that is substantially perpendicular to the insertion direction of the expansion valve 60 in a stable manner, i.e., in the insertion direction from an upside of FIG. 5A toward the head of the expansion valve 60, thereby allowing the seal device 1 to have a stable sealing between the seal rib 23 and the expansion valve 60.

The morph portion 24 has an increased thickness and a decreased amount of protrusion from a seal lip 22 side toward a seal rib 23 side. In this manner, the morph portion 24 connects the seal lip 22 and the seal rib 23 smoothly in terms of a shape in the cross section.

The second abutment portion 21 of the second seal 20 is formed to surround the expansion valve 60. The second abutment portion 21 uses both of the seal lip 22 and the seal rib 23 for sealing the expansion valve 60 according to a feature of an outer shape of the expansion valve 60.

More practically, the second abutment portion 21 has the seal lip 22 on a portion that faces the linear sides 601A, 601B and the curved portion 601C of the body 61 of the expansion valve 60 for securing a stable seal of a gap between the expansion valve 60 and the second seal 20 that is otherwise loosened by variation of the dimension of the gap. Further, the corner portion 603 of the outer shape of the expansion valve 60 is securely sealed with the seal rib 23 instead of the seal lip 22 that tends to form a ripple shape in an abutment condition.

The seal device 1 having the above described structure is disposed to cover a gap between the through-hope periphery 501 of the case 50 and the outer surface 601 of the expansion valve 60 with a cover 52 engaged therewith from an outer side for abutting the first abutment portion 11 of the first seal 10 against the through-hope periphery 501 as shown in FIG. 1.

The through-hope periphery 501 of the case 50 has the protruding edge 502 that protrudes toward an outside of the case 50 in an axial direction of the through hole 51. The concave 101 in the first seal 10 substantially formed in a V shape in the cross section has the protruding edge 502 inserted therein.

Figure 6A:
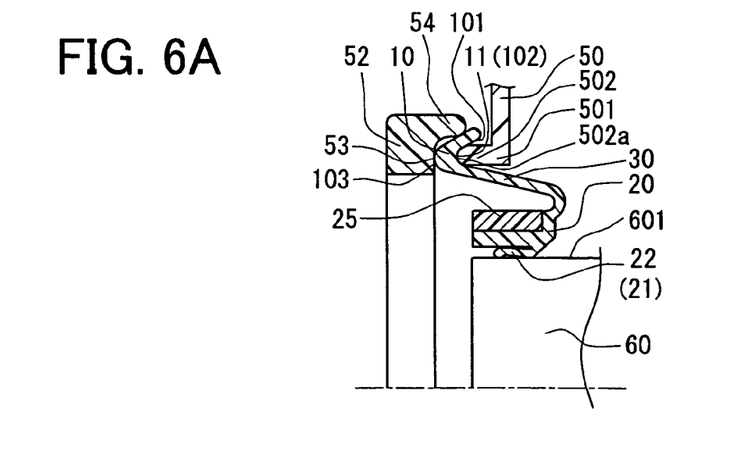
FIGS. 6A to 6C show cross-sectional views of the sealing device when a position of an expansion valve relative to a case is modified.

As shown in detail in FIG. 6A, the cover 52 in a frame shape made of resin has a press surface 53 formed thereon for pressing the first seal 10. The press surface 53 presses a top 103 of a curve of the first seal 10 when the cover 52 is engaged with the case 50 with a hook and a catcher or the like. In this manner, a bottom 102 of the concave 101 of the first seal 10 is abutted against a top 502a of the protruding edge 502 as the first abutment portion 11.

Therefore, the concave 101 of the first seal 10 is engaged with the protruding edge 502 of the through hole 51 with an increased amount of abutment force applied thereto.

In other words, the first seal 10 is formed to wrap the top 502a of the protruding edge 502 that protrudes toward the axial direction of the through hole 51 at the periphery of the through hole 51 in the case 50. Therefore, the cover 52 disposed on the case 50 presses the first seal 10 against the protruding edge 502 for pressing the first abutment portion 11 against the top 502a of the protruding edge 502 along the entirety of the through-hope periphery 501.

In this manner, the first seal 10 is pressed by the cover 52 against the protruding edge 52 of the case 50 for having a secure sealing of the through-hope periphery 501 with the first abutment portion 11.

In this case, an outer side of the press surface 53 of the cover 52 has a standing wall 54 for stably supporting the positional relationship of the first seal 10 and the cover 52 and for preventing an outside edge of the first seal 10, i.e., an edge on an opposite side of the connecting side of the connection portion 30, from falling outwardly.

In this manner, the sealing of the gap between the first seal 10 and the case 50 is secured.

The engagement of the cover 52 with the case 50 is provided by the hook and the catcher or the like in this case. However, the engagement may be provided by a screw or by other devices.

The second seal 20 of the seal device 1 has the support plate 25 that has the inner surface 251 shaped in a corresponding shape of the outer shape of the expansion valve 60 disposed in the through hole 51 of the case 50 at an outside of the second abutment portion 21 and has a portion of the inner surface 251 shaped in a corresponding shape of the curved portion 601C of the outer surface 601 of the expansion valve 60 at a curved portion 601C facing portion. The support plate 25 is made of a material with a higher elasticity relative to rubber or thermoplastic elastomer for forming the second abutment portion 21.

Therefore, the abutment of the second abutment portion 21 of the second seal 20 against the outer surface 601 of the expansion valve 60 is stably supported by the support plate 25. The support of the support plate 25 is especially beneficial for having the stable abutment at the curved portion 601C along the boundary between the first body portion 61A and the second body portion 61B of the body 61 of the expansion valve 60, that is, the outer surface of the step portion 61C.

In this manner, a seal surface pressure is evenly provided for the entire area of the second abutment portion 21 in the circular direction. Therefore, the expansion valve 60 disposed in the through hole 51 of the case 50 with the complex outer shape can be stably and securely sealed with the seal device 1 without having a dedicated sealing structure for sealing the expansion valve 60. Therefore, the seal device 1 securely seals the component in the through hole 51 without increasing its volume.

Further, the concave housing 201a between the linear section 251D of the support plate 25 of the second seal 20 and the second abutment portion 21 for housing the diaphragm 62 houses the diaphragm 62 when the seal device 1 has the expansion valve 60 inserted therein for abutting the second abutment portion 21 in the narrow part 63 against the body 61.

In this manner, the second abutment portion 21 is pressed against the entire surface of the body 61 having the curved portion 601C for securely sealing the outer surface 601 of the expansion valve 60. Further, the inner surface 251 of the support plate 25 in the corresponding shape of outer surface 601 of the body 61 surrounds the body 61 and the diaphragm 62 housed in the concave housing 201a for securely sealing the outer surface 601 of the expansion valve 60.

Furthermore, the support plate 25 made of the highly elastic material relative to the rubber or the thermoplastic elastomer provides the ease of handling when the seal device 1 is installed.

The second abutment portion 21 of the second seal 20 uses both of the seal lip 22 and the seal rib 23 connected with each other by the morph portion 24 that smoothly connects the two parts for sealing the expansion valve 60 according to the outer shape thereof. In this manner, the entire surface of the expansion valve 60 is securely sealed by the seal device 1.

Figure 6B:
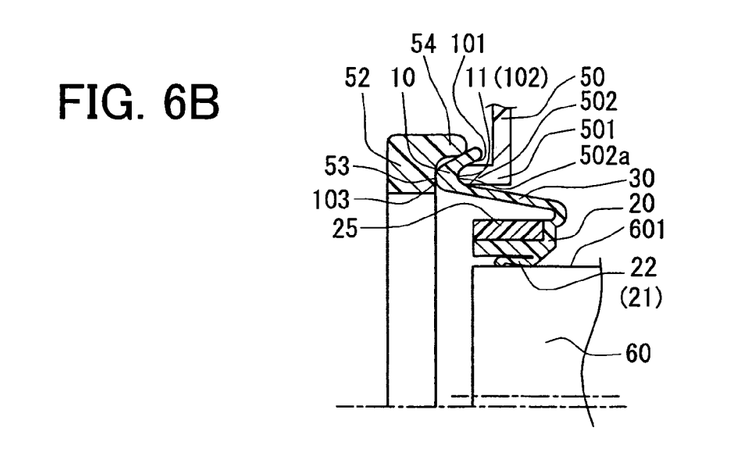
Figure 6C:
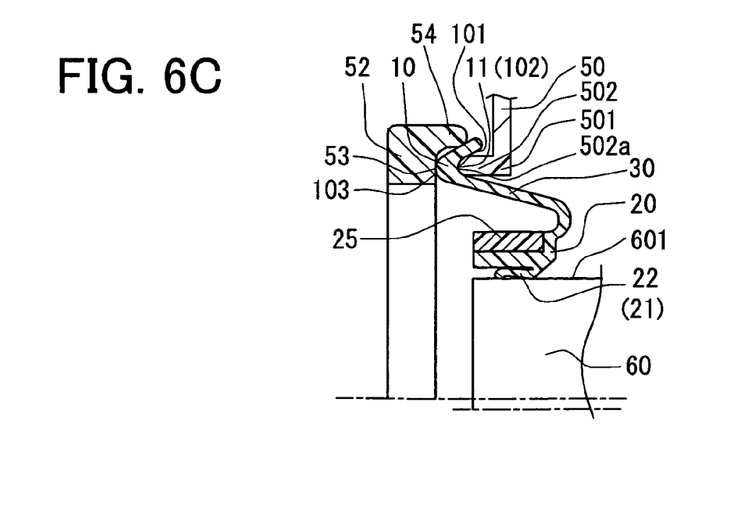

The seal device 1 has the connection portion 30 that is elastically deformable into various shapes for connecting the first seal 10 and the second seal 20. Therefore, the positional variation of the expansion valve 60 relative to the case 50 in an installation procedure or caused by external forces applied thereto can be absorbed by deformation of the connection portion 30 as shown in FIGS. 6A to 6C. In this manner, the sealing by the first seal 10 and the second seal 20 is kept unchanged and prevented from deterioration when the position of the expansion valve 60 is changed.

In the structure described above, the first and second abutment portions 11, 21 obliquely disposed relative to a horizontal direction of the seal device 1 have a water passage 40 formed thereon for guiding water condensation formed on a surface of the expansion valve 60 toward a lower most part of the second seal 20 as shown in FIGS. 1, 2, and 4.

Further, the water passage 40 has at a downstream end a top 411 of a protruding rib 41 that drops the water condensation on an inner surface of the air-conditioner case 50.

In this manner, the water condensation on the surface of the expansion valve 60 is expelled through the water passage 40 and is prevented from accumulating on the second abutment portion 21 of the second seal 20. Further, the water condensation can be expelled from a drain hole (not shown) in the case 50 by dropping the water condensation from the top 411 of the protruding rib 41 onto the inner surface of the case 50. Therefore, the water condensation is prevented from accumulating on the first abutment portion 11 of the first seal 10.

Although the present invention has been fully described in connection with the preferred embodiment thereof with reference to the accompanying drawings, it is to be noted that various changes and modifications will become apparent to those skilled in the art.

Figure 7:
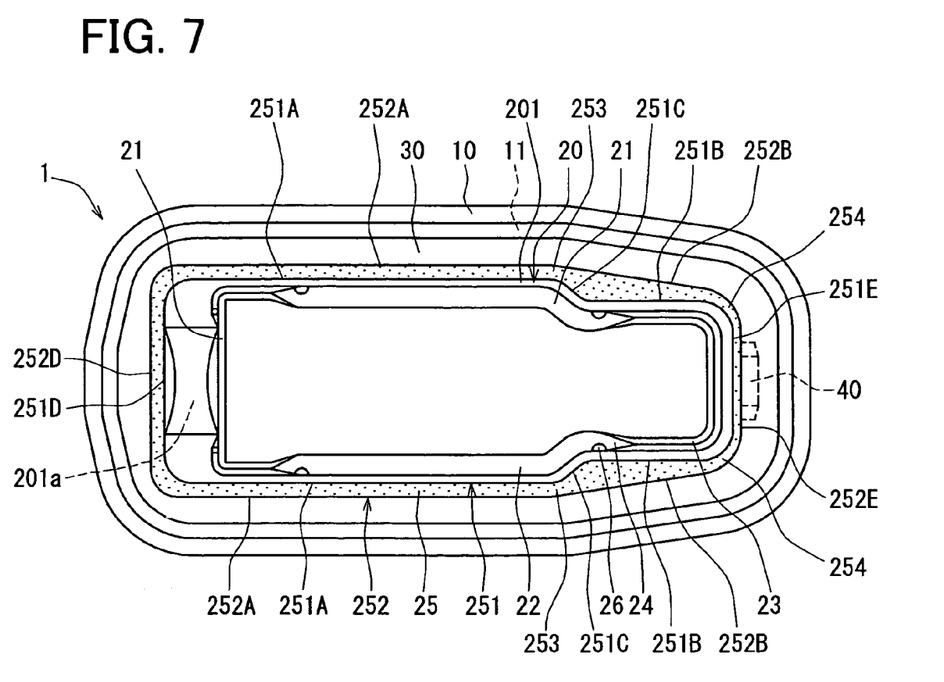
FIG. 7 shows a front view of the sealing device in another embodiment.

For example, as shown in FIG. 7, the second seal 20 of the seal device 1 may have a restrictive protrusion 26 for restricting the warpage of the morph portion 24.

The seal device 1 in FIG. 7 has the seal lip 22 and the seal rib 23 having the morph portion 24 as an interconnecting portion for smooth transition therebetween, and the protrusion of the seal rib 23 is smaller than the protrusion of the seal lip 22.

The restrictive protrusion is formed on the body 201 of the second seal 20 for being positioned between the body 201 and the protrusion of the morph portion 24.

The warpage of the morph portion 24 is controlled by both of the warpage of the seal lip 22 and the warpage of the seal rib 23 due to the position of the morph portion 24 between the lip 22 and the rib 23. Therefore, the control over the warpage of the morph portion 24 is important.

The restrictive protrusion 26 precisely controls the warpage of the morph portion 24 by restricting the warpage over a predetermined amount that is determined based on a seal characteristics such as the seal surface pressure or the like. In this manner, the warpage of the morph portion 24 is restricted even when the warpage of the seal lip 22 by the insertion of the expansion valve 60 induces the warpage of the morph portion 24 over the predetermined amount. Therefore, the sealing of the seal device 1 is kept from deterioration.

Further, the restrictive protrusion 26 may be used to apply a pressure on the outer surface of the morph portion 24, that is, a body 201 side surface, for improving the sealing of the seal device 1 while restricting the warpage of the morph portion 24 over the predetermined amount.

The restrictive protrusion 26 may be formed on the body 201, or may be formed on the morph portion 24.

The shape of the morph portion 24 may be spherical as shown in FIG. 7, or may take other forms that have different height, circumferential length or the like according to the requirement of the sealing characteristics.

The seal lip 22 of the second abutment portion 21 is used in combination with the seal rib 23 in the embodiment described above. However, the seal lip 22 may be used without having the seal rib 23 combined therewith, or the seal rib 23 may be used without having the seal lip 22.

The first seal 10 and the second seal 20 are connected by the connection portion 30 in the embodiment described above. However, the first seal 10 and the second seal 20 may be connected by other part. For example, the connection portion 30 may have a straight shape instead of the J shape used in the embodiment described above. Further, the first seal 10 and the second seal 20 may be connected at a portion different from an end portion in the insertion direction of the expansion valve 60. That is, the connection portion 30 may be at a middle portion in the insertion direction.

Furthermore, the connection portion 30 may be omitted and the first seal 10 and the second seal 20 may be connected directly for covering the entire surface of the expansion valve 60 in order to seal the gap between the outer surface 601 of the expansion valve 60 and the through-hope periphery 501 of the case 50.

The material used for forming the support plate 25 on the second seal 20 may be different from the polypropylene. For example, the material of the support plate 25 may be PPS resin, other resin material or metallic material such as aluminum or the like. Further, the material may be rubber or elastomer for applying a higher elastic force. Furthermore, the support plate 25 may be attached on the second seal by using adhesive or the like.

The component sealed in the through hole 51 of the case 50 may be a component that is different from the expansion valve 60. The partition may be different from the air-conditioner case 50. For example, the partition may be a partition wall between an engine room and a passenger space in the vehicle.

Figure 8:
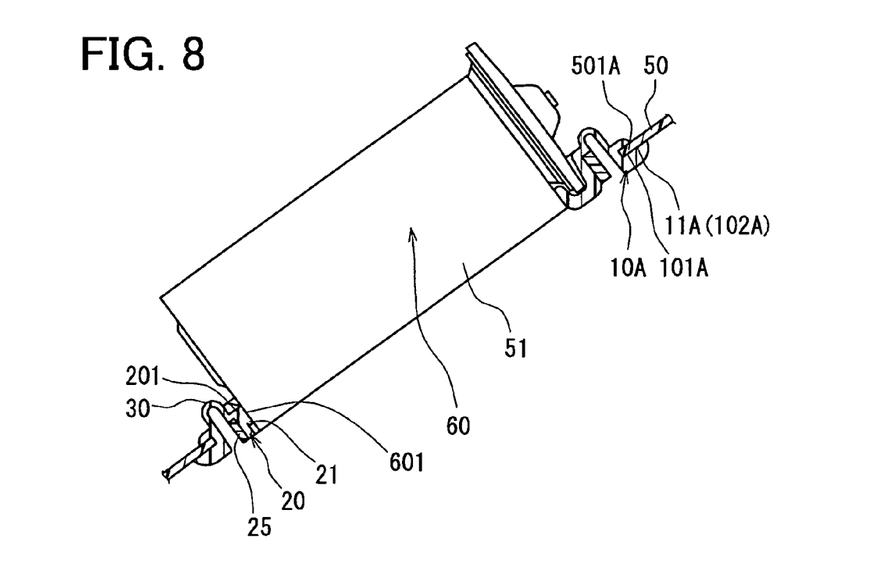
FIG. 8 shows a cross-sectional view of the sealing structure in yet anther embodiment.

Furthermore, as shown in FIG. 8, the seal device 1 may have a first seal 10A that is equipped with a first abutment portion 11A for binding a through-hope periphery 501A of the case 50. In this manner, the cover 52 may be omitted.

The first seal 10A of the seal device 1 in FIG. 8 has a binding concave 101A for binding the through-hope periphery 501A. The binding concave 101A in a slit shape that has a smaller slit thickness in comparison with the thickness-of the through-hope periphery 501A preferably engages the through-hope periphery 501A that extends in the longitudinal direction of the case 50. That is, an inner surface 102A of the binding concave 101A is pressed against the entire periphery of the through-hope periphery 501A. Therefore, the inner surface 102A of the binding concave 101A serves as the first abutment portion 11A. In this manner, the entire periphery of the through-hope periphery 501A is evenly and securely sealed.

The seal device 1 is advantageously used for sealing a component in the vehicle where the component and the seal device are susceptible to various restriction factors such as complex shape of the component, vibration from the power source, space for installation or the like. However, the seal device 1 may be used for sealing a component in a structure that is different from the vehicle.

Such changes and modifications are to be understood as being within the scope of the present invention as defined by the appended claims.

What is claimed is:

1. A seal device for sealing a through hole in a partition comprising:
    a first seal providing a first abutment portion that abuts against a periphery of the through hole in an entirety thereof; and
    a second seal providing a second abutment portion that is made of an elastic material abutting against an outer peripheral surface of a component disposed in the through hole,
    wherein the first seal and the second seal are connected to cover an entire space between the periphery of the through hole and the outer peripheral surface of the component,
    the component has a bent portion in the outer peripheral surface thereof, and
    the second seal has a support member with a higher elasticity relative to the second abutment portion on an outer side of the second abutment portion, the support member having an inner peripheral surface thereof shaped in a corresponding form of the outer shape of the component and having a bent facing section of the inner peripheral surface thereof shaped in a corresponding form of the bent portion of the component; wherein
    a section along a periphery of the second abutment portion forms an elongated protrusion that is bent by the component in a component insertion direction for abutting against the outer peripheral surface of the component,
    a rest of the periphery that substantially forms a remaining portion of the periphery of the second abutment portion forms a rib shape protrusion that is smaller than the elongated protrusion and is pressed in a substantially perpendicular direction relative to the component insertion direction for abutting against the outer peripheral surface of the component, and
    the elongated protrusion and the rib shape protrusion are connected with each other along the periphery at a morphing portion that gradually morphs respective cross sections of the rib shape protrusion and the elongated protrusion for interconnection.

2. The seal device as in claim 1,
    wherein the second abutment portion has the elongated protrusion at a section that corresponds to a substantially linear section of an outer shape of the component, and
    the second abutment portion has the rib shape protrusion at a section that corresponds to a corner section of the outer shape of the component.

3. The seal device as in claim 1,
    wherein the second seal has a restriction protrusion that restricts bending of the morphing portion beyond a predetermined amount when the elongated protrusion is bent to cause the bent of the morphing portion.

4. The seal device as in claim 1,
    wherein a tip end of the elongated protrusion protrudes obliquely toward a head of the component relative to a base end of the elongated protrusion in the component insertion direction.

5. The seal device as in claim 1,
    wherein a base end of the rib shape protrusion has a concave portion on a head side of the component in the component insertion direction.

6. The seal device as in claim 1,
    wherein the first seal and the second seal are disposed apart from each other, and
    the first seal and the second seal are connected with each other at a connection portion that is deformable.

7. The seal device as in claim 1,
    wherein the first seal wraps a tip of a protruding end that protrudes in a piercing direction of the through hole on a periphery of the through hole in the partition, and
    a covering member is disposed on the partition in a covering manner over the first seal, the covering member presses the first seal against the protruding end for causing the first abutment portion to be abutted against the tip of the protruding end along the periphery of the through hole in the entirety thereof.

8. The seal device as in claim 1,
    wherein the first seal has a groove for bindingly holding the periphery of the through hole, and
    an inside surface of the groove serves as the first abutment portion that abuts against the periphery of the through hole in the entirety thereof when the periphery of the through hole is inserted into the groove.

9. The seal device as in claim 1,
    wherein the partition separates a space in a vehicle.

10. The seal device as in claim 9,
    wherein the partition is an air-conditioner case that guides air flowing into the space in the vehicle.

11. The seal device as in claim 10
    wherein the component is an expansion valve that provides a coolant expansion under reduced pressure for a heat exchanger disposed in the case.

12. A seal device for sealing a through hole in a partition comprising:
a first seal providing a first abutment portion that abuts against a periphery of the through hole in an entirety thereof; and
a second seal providing a second abutment portion that is made of an elastic material abutting against an outer peripheral surface of a component disposed in the through hole,
wherein the first seal and the second seal are connected to cover an entire space between the periphery of the through hole and the outer peripheral surface of the component,
the component has a bent portion in the outer peripheral surface thereof, and
the second seal has a support member with a higher elasticity relative to the second abutment portion on an outer side of the second abutment portion, the support member having an inner peripheral surface thereof shaped in a corresponding form of the outer shape of the component and having a bent facing section of the inner peripheral surface thereof shaped in a corresponding form of the bent portion of the component; wherein
a section along a periphery of the second abutment portion forms an elongated protrusion that is bent by the component in a component insertion direction for abutting against the outer peripheral surface of the component,
a rest of the periphery that substantially forms a remaining portion of the periphery of the second abutment portion forms a rib shape protrusion that is smaller than the elongated protrusion and is pressed in a substantially perpendicular direction relative to the component insertion direction for abutting against the outer peripheral surface of the component, and
the elongated protrusion and the rib shape protrusion are connected with each other along the periphery at a morphing portion that gradually morphs respective cross sections of the rib shape protrusion and the elongated protrusion for interconnection;
the partition separates a space in a vehicle;
the partition is an air-conditioner case that guides air flowing into the space in the vehicle;
the component is an expansion valve that provides a coolant expansion under reduced pressure for a heat exchanger disposed in the case;
the expansion valve includes a body having a valve member and a diaphragm disposed adjacent to the body for controlling a degree of opening of the valve member,
the bent portion is formed on an outer peripheral surface of the body,
the second abutment portion is abutted against an entire outer peripheral surface of the body,
the support member surrounds the body and the diaphragm portion with the inner peripheral surface thereof formed in a corresponding shape of the outer peripheral surface of the body, and
the diaphragm portion is housed in a housing concave portion formed in the second seal.

13. A seal device for sealing a through hole in a partition comprising:
a first seal providing a first abutment portion that abuts against a periphery of the through hole in an entirety thereof; and
a second seal providing a second abutment portion that is made of an elastic material abutting against an outer peripheral surface of a component disposed in the through hole,
wherein the first seal and the second seal are connected to cover an entire space between the periphery of the through hole and the outer peripheral surface of the component,
the component has a bent portion in the outer peripheral surface thereof, and
the second seal has a support member with a higher elasticity relative to the second abutment portion on an outer side of the second abutment portion, the support member having an inner peripheral surface thereof shaped in a corresponding form of the outer shape of the component and having a bent facing section of the inner peripheral surface thereof shaped in a corresponding form of the bent portion of the component; wherein
a section along a periphery of the second abutment portion forms an elongated protrusion that is bent by the component in a component insertion direction for abutting against the outer peripheral surface of the component,
a rest of the periphery that substantially forms a remaining portion of the periphery of the second abutment portion forms a rib shape protrusion that is smaller than the elongated protrusion and is pressed in a substantially perpendicular direction relative to the component insertion direction for abutting against the outer peripheral surface of the component, and
the elongated protrusion and the rib shape protrusion are connected with each other along the periphery at a morphing portion that gradually morphs respective cross sections of the rib shape protrusion and the elongated protrusion for interconnection;
the partition separates a space in a vehicle;
the partition is an air-conditioner case that guides air flowing into the space in the vehicle;
the component is an expansion valve that provides a coolant expansion under reduced pressure for a heat exchanger disposed in the case;
the second abutment portion is obliquely disposed relative to a horizontal direction with a water passage formed thereon for guiding water condensation formed on a surface of the expansion valve.

14. The seal device as in claim 13,
wherein the water passage has a downstream end that drops the water condensation on an inner surface of the air-conditioner case.

15. A sealing structure comprising:
a partition for separating a space with a through hole bored therein;
a component disposed in the through hole;
a first seal providing a first abutment portion that abuts against an entirety of a periphery of the through hole in the partition;
a second seal providing a second abutment portion that abuts against an entirety of an outer peripheral surface of the component disposed in the through hole; and
a seal device connecting the first seal and the second seal with each other to cover an entire area between the periphery of the through hole and the outer peripheral surface of the component,
wherein the component has a bent portion in the outer peripheral surface thereof, and
the seal device has a support member with a higher elasticity relative to the second abutment portion on an outer side of the second abutment portion of the second seal, the seal device having an inner peripheral surface thereof shaped in a corresponding circular form of the outer shape of the component and having a bent facing section in the inner peripheral surface thereof shaped in a corresponding form of the bent portion of the component; wherein a section along a periphery of the second abutment portion forms an elongated protrusion that is bent by the component in a component insertion direction for abutting against the outer peripheral surface of the component, a rest of the periphery that substantially forms a remaining portion of the periphery of the second abutment portion forms a rib shape protrusion that is smaller than the elongated protrusion and is pressed in a substantially perpendicular direction relative to the component insertion direction for abutting against the outer peripheral surface of the component, and the elongated protrusion and the rib shape protrusion are connected with each other along the periphery at a morphing portion that gradually morphs respective cross sections of the rib shape protrusion and the elongated protrusion for interconnection.

* * * * *